(12) United States Patent
Lambert (10) Patent No.: US 11,162,216 B2
(45) Date of Patent: Nov. 2, 2021

(54) METHOD FOR TREATING BIOMASS AND DEVICE FOR TREATING BIOMASS

(71) Applicant: Valmet AB, Sundsvall (SE)

(72) Inventor: Francois Lambert, Sundsvall (SE)

(73) Assignee: Valmet AB, Sundsvall (SE)

( * ) Notice: Subject to any disclaimer, the term of this patent is extended or adjusted under 35 U.S.C. 154(b) by 0 days.

(21) Appl. No.: 16/348,806

(22) PCT Filed: Dec. 7, 2017

(86) PCT No.: PCT/EP2017/081916
§ 371 (c)(1),
(2) Date: May 9, 2019

(87) PCT Pub. No.: WO2018/104484
PCT Pub. Date: Jun. 14, 2018

(65) Prior Publication Data
US 2019/0345671 A1    Nov. 14, 2019

(30) Foreign Application Priority Data

Dec. 8, 2016 (EP) ..................................... 16202908

(51) Int. Cl.
*D21C 1/02* (2006.01)
*D21B 1/22* (2006.01)
*D21C 9/02* (2006.01)

(52) U.S. Cl.
CPC .................. *D21C 1/02* (2013.01); *D21B 1/22* (2013.01); *D21C 9/02* (2013.01)

(58) Field of Classification Search
CPC ..................................... D21C 1/02; D21B 1/22
See application file for complete search history.

(56) References Cited

U.S. PATENT DOCUMENTS 4,187,141 A    2/1980  Ahrel
5,266,159 A    11/1993 Greenwood et al.
(Continued)

FOREIGN PATENT DOCUMENTS

CN    1568246 A     1/2005
CN    101268121 A   9/2008
(Continued)

OTHER PUBLICATIONS

Extended European Search Report in EP Application No. 16202908.6, dated Mar. 13, 2017 (7 pages).
(Continued)

*Primary Examiner* — Jacob T Minskey
(74) *Attorney, Agent, or Firm* — Foley & Lardner LLP (57) ABSTRACT

The invention relates to a method for treating biomass (1). In a step (S10) of the method, the biomass (1) and an amount of water (2) is fed into a first reactor unit (10) such that the biomass (1) is impregnated using the amount of water (2) while the biomass (1) is transferred through the first reactor unit (10) by a conveyor means (11). In another step (S20), the impregnated biomass (22) is transferred from the first reactor unit (10) to a separation unit (20) in which at least a part (21) of the amount of water (2) used for impregnation can be separated from the impregnated biomass (22). In another step (S30), the impregnated biomass (22) is transferred from the separation unit (20) into a second reactor unit (30) in which the impregnated biomass (22) is subjected to a predetermined pressure (S30). The invention further relates to the use of the method for treating non-wood material as well as to a device for treating biomass (1).

15 Claims, 3 Drawing Sheets

(56) References Cited

U.S. PATENT DOCUMENTS

| | | |
|---|---|---|
| 2004/0060673 A1 | 4/2004 | Phillips et al. |
| 2004/0234692 A1 | 11/2004 | Nopper |
| 2009/0065158 A1 | 3/2009 | Benjelloun Mlayah et al. |
| 2014/0083918 A1 | 3/2014 | Nguyen et al. |
| 2014/0315258 A1 | 10/2014 | Nguyen |

FOREIGN PATENT DOCUMENTS

| | | |
|---|---|---|
| CN | 101341288 A | 1/2009 |
| CN | 101798584 A | 8/2010 |
| CN | 101802299 A | 8/2010 |
| CN | 101835804 A | 9/2010 |
| CN | 101952449 A | 1/2011 |
| CN | 101953226 A | 1/2011 |
| CN | 102177293 A | 9/2011 |
| CN | 103097606 A | 5/2013 |
| CN | 103339237 A | 10/2013 |
| CN | 103898780 A | 7/2014 |
| WO | WO-99/41448 A1 | 8/1999 |
| WO | WO-2004/005608 A1 | 1/2004 |
| WO | WO-2007/009463 A2 | 1/2007 |
| WO | WO-2007/063171 A1 | 6/2007 |
| WO | WO-2009/012779 A2 | 1/2009 |
| WO | WO-2009/012779 A3 | 5/2009 |
| WO | WO-2011/039635 A2 | 4/2011 |
| WO | WO-2015/199604 A1 | 12/2015 |
| WO | WO-2016/199604 A1 | 12/2016 |

OTHER PUBLICATIONS

International Search Report & Written Opinion in International Application No. PCT/EP2017/081929, dated Feb. 1, 2018 (11 pages).

International Search Report and Written Opinion in International Application No. PCT/EP2017/081916, dated Jan. 18, 2018 (11 pages).

International Search Report and Written Opinion in International Application No. PCT/EP2017/081930, dated Feb. 6, 2018 (12 pages).

Foreign Office Action on CN Patent Application No. 201780069706.5 dated Feb. 26, 2021 (including English translation) (13 pages).

Foreign Office Action on CN Patent Application No. 201780069714.X dated Mar. 3, 2021 (with English translation) (23 pages).

Foreign Office Action on CN Patent Application No. 201780069753.X dated Mar. 5, 2021 (with English translation) (20 pages).

Hongzhang Chen, Lignocellulose Biorefinery Engineering, Principles and Applications, Woodhead Publishing Series in Energy: No. 74, 2021, 275 pages.

METHOD FOR TREATING BIOMASS AND DEVICE FOR TREATING BIOMASS

CROSS-REFERENCE TO RELATED APPLICATIONS

The present application is a U.S. National Phase Entry Application under 35 U.S.C. § 371 that claims the benefit of International Application No. PCT/EP2017/081916, filed on Dec. 7, 2017, and which in turn claims the benefit of EP Application No. 16202908.6, filed on Dec. 8, 2016, the entire disclosures of which are incorporated herein by reference.

FIELD OF THE INVENTION

The invention generally relates to processes for treating biomass. In particular, the invention relates to a method for treating biomass, a use of the method for treating non-wood material and a device for treating biomass.

BACKGROUND OF THE INVENTION

Biomass treatment processes are often used to produce sugar, ethanol, chemicals or fuel. In such processes, the biomass may be pre-treated in different ways. For example, the biomass is pre-steamed before a reaction of an impregnation liquid with the biomass takes place. The advantage of steaming the biomass is that the material is more evenly treated and the accessibility of the impregnation liquid to the material is increased. Pre-steaming and steaming of wood material is generally used in the pulp and paper industry. For example, the steaming of the biomass is used to remove air from pores in the material, to increase the temperature of the material and to increase the penetration of chemicals in the material. However, the steaming often requires a certain time span until appropriate characteristics of the material are achieved. In particular, long steaming times may occur, especially when using non-wood material as biomass.

SUMMARY OF THE INVENTION

It is an object of the present invention to provide an improved process for treating biomass.

This object is achieved by the subject-matter of the independent claims. Further exemplary embodiments are evident from the dependent claims and the following description.

According to an aspect of the invention, a method for treating biomass is provided. The biomass and an amount of water are fed into a first reactor unit such that the biomass is impregnated using the amount of water while the biomass is transferred through the first reactor unit by a conveyor means, for example by a screw conveyor. Afterwards, the impregnated biomass is transferred from the first reactor unit to a separation unit in which at least a part of the amount of water used for impregnation can be separated from the impregnated biomass. Afterwards, the impregnated biomass is transferred from the separation unit into a second reactor unit in which the impregnated biomass is subjected to a predetermined and/or controllable pressure.

Such a method is especially advantageous if non-wood material is used in a biomass treatment process. In particular, the amount of water may be introduced as impregnation liquid into the first reactor unit instead of steaming the biomass within the first reactor unit. The compression of the non-wood material, for example wheat straw or grass, may decrease the permeability of the material column in the first reactor unit such that it is difficult to add steam to this kind of material in the first reactor unit. However, using water instead of steam in the first reactor unit may increase the permeability of the material column in the first reactor unit.

It is possible that only the amount of water as well as the biomass to be treated are fed into the first reactor unit. This means that water is used as impregnation liquid for the impregnation of the biomass fed into the first reactor unit. This may be water available in a mill, for example process water, fresh water or condensate. For example, pure water may also be used as impregnation liquid for the impregnation of the biomass fed into the first reactor unit.

The conveyor means which transfers the biomass through the first reactor unit during the impregnation of the biomass may be a screw conveyor which is arranged within the first reactor unit. In this manner, the biomass to be treated may be transferred through the amount of water fed into the first reactor unit such that the whole biomass is homogeneously impregnated by the amount of water.

After the biomass has been impregnated in the first reactor unit using the amount of water, the impregnated biomass is transferred from the first reactor unit to the separation unit where at least a part of the amount of water used for impregnation is separated from the impregnated biomass. This separation may be carried out using a screw press which increases the pressure on the material in the separation unit. The separation of the amount of water from the impregnated biomass may also be referred to as dewatering of the biomass. The part of the amount of water which is separated from the impregnated biomass in the separation unit may be reused for the impregnation in the first reactor unit or for washing the raw material, e.g. the biomass, before the biomass is introduced into the first reactor unit.

After the part of the amount of water has been separated from the impregnated biomass, the impregnated biomass is transferred from the separation unit into the second reactor unit in which the impregnated biomass is subjected to a predetermined pressure, wherein the pressure is controllable. In the second reactor unit, a reaction between the impregnated biomass and the impregnation liquid may take place. In particular, a hydrolysis of the impregnated biomass may take place in the second reactor unit. Therefore, the amount of water which is still present in the impregnated biomass may react with the impregnated biomass in order to obtain end products like sugar, ethanol, chemicals or fuel. It should be understood that the biomass is not only impregnated within the first reactor unit. However, it is also possible that the biomass is impregnated during the transfer of the biomass from the first reactor unit to the separation unit and during the transfer of the biomass to the second reactor unit and also within the second reactor unit.

According to an embodiment of the invention, the impregnation of the biomass in the first reactor unit is carried out exclusively using the amount of water fed into the first reactor unit.

In particular, water is used for impregnating the biomass in the first reactor unit. This means that no other impregnation liquid is fed into the first reactor unit besides the amount of water. However, it is possible that a further impregnation liquid is fed into the system downstream of the first reactor unit. In particular, it is possible that an acid or a catalyst is fed into the system downstream the first reactor unit. For example, a catalyst may be fed into the system downstream of the separation unit and upstream the second reactor unit. For example, the catalyst is an aqueous solution, EtOH or mixtures thereof.

However, it is advantageous if only water is fed into the first reactor unit such that the biomass fed into the first reactor unit is impregnated using exclusively the amount of water. Furthermore, it is possible that no steaming of the biomass in the first reactor unit is carried out.

According to another embodiment of the invention, the amount of water is fed into the first reactor unit up to a predetermined fill level of the first reactor unit.

In this manner, it is possible that the whole biomass fed into the first reactor unit is homogeneously impregnated by the amount of water in the first reactor unit. In particular, the first reactor unit may be arranged such that the whole biomass is conveyed through the amount of water in the first reactor unit. This may be achieved by filling the amount of water up to the predetermined fill level in the first reactor unit. The first reactor unit may therefore be vertically arranged with respect to an earth's surface as will be described in more detail hereinafter.

According to another embodiment of the invention, the impregnated biomass is transferred from the first reactor unit into a retention vessel before transferring the impregnated biomass to the separation unit. The impregnated biomass is steamed in the retention vessel by controlling a pressure within the retention vessel.

The retention vessel may be operated at pressurized or atmospheric conditions. In particular, the pressure in the retention vessel may be controlled. The retention vessel may be arranged between the first reactor unit and the separation unit such that the impregnated biomass coming from the first reactor unit is retained in the retention vessel before it is transferred to the separation unit. Within the retention vessel, the impregnated biomass may allow a further impregnation of the biomass by means of the amount of water. The retention vessel may further enhance a homogeneous impregnation of the biomass by means of the amount of water. Therefore, the retention vessel may also be referred to as buffer bin or homogenization bin as a further homogeneous impregnation of the biomass takes place in the retention vessel.

By controlling the pressure within the retention vessel, the impregnated biomass may further be steamed. In particular, the steaming of the impregnated biomass takes place after impregnating the biomass by means of the amount of water in the first reactor unit. The impregnation of the biomass in the first reactor unit and the steaming of the impregnated biomass in the retention vessel are thus carried out in separate treatment units being arranged one after the other.

According to another embodiment of the invention, the pressure in the retention vessel is equal to a pressure in the first reactor unit.

According to another embodiment of the invention, the predetermined pressure within the second reactor unit is controlled using a plug screw or a rotary valve, wherein the plug screw or the rotary valve is arranged between the separation unit and the second reactor unit.

However, in addition to the plug screw, a force feed screw may be arranged upstream of the second reactor unit in order to compress the impregnated biomass before it is fed into the second reactor unit. In this manner, the pressure within the second reactor unit can be controlled or adjusted. Furthermore, it is possible that a rotary valve is used to control or adjust the predetermined pressure within the second reactor unit. The plug screw or the rotary valve may therefore be adapted to increase the pressure in the second reactor unit compared to the pressure in the separation unit.

According to another embodiment of the invention, the biomass is pre-steamed before feeding the biomass into the first reactor unit, wherein a pressure and/or a temperature during the pre-steaming can be controlled.

The pre-steaming may be carried out using a steam mixer screw arranged within a pre-steaming unit, e.g. a pre-steaming reactor. The pre-steaming reactor may be arranged upstream the first reactor unit such that the biomass, i.e. the raw material, is pre-steamed in the pre-steaming reactor before it is introduced into the first reactor unit where the pre-steamed biomass is impregnated using the amount of water.

According to another embodiment of the invention, a temperature difference between the temperature during the pre-steaming of the biomass and the temperature during the impregnation of the biomass in the first reactor unit is controlled.

In particular, the temperature difference between the biomass in the pre-steaming reactor and the biomass in the first reactor unit can be controlled. This temperature difference between the pre-steaming stage and the impregnation stage is provided in order to achieve a better penetration of the impregnation liquid, e.g. the amount of water, in the biomass within the first reactor unit.

Furthermore, a plug screw may be arranged upstream the first reactor unit wherein the plug screw creates fractures in the material, e.g. the biomass, such that the penetration of the amount of water in the biomass within the first reactor unit is further increased.

According to another embodiment of the invention, the biomass is washed in a washing unit by means of a washing liquid before feeding the washed biomass into the first reactor unit.

The washing liquid may comprise water which is recirculated back from the separation unit. The washing of the biomass is carried out in order to clean the biomass, i.e. the raw material, before the biomass is impregnated in the first reactor unit. For example, sand, stone and metal is removed from the biomass before it is impregnated in the first reactor unit. Therefore, a washing liquid of a specified composition may be used in order to wash the biomass in the washing unit.

According to another embodiment of the invention, the water separated in the separation unit is recirculated back to the washing unit and the recirculated water is used for washing the biomass in the washing unit.

In this manner, it is possible to reduce the water consumption in the whole process since at least a part of the amount of water used for impregnation can also be used for washing the biomass before the washed biomass is introduced into the first reactor unit. Before the recirculated water is used for washing the biomass, it may further be mixed with a washing agent such that washing liquid for washing the biomass in the washing unit is obtained.

According to another embodiment of the invention, the biomass is compressed using a plug screw feeder, e.g. a screw press, before feeding the compressed biomass into the first reactor unit for impregnation such that residual washing liquid is separated from the biomass during compression and the residual washing liquid is recirculated back to the washing unit, wherein the residual washing liquid is reused for washing the biomass in the washing unit.

The washing liquid may for instance be a washing agent which is suitable for removing sand, stone or metal from the raw material, e.g. the biomass. The washing liquid may be separated or pressed out of the washed biomass during the compression of the biomass. The compression may be carried out in a compression unit arranged upstream the first reactor unit. After the washing liquid or at least a part of the washing liquid has been separated from the washed biomass, the separated washing liquid is recirculated back to the washing unit where it is reused for washing the biomass. In this manner, washing agent used for washing the biomass may be recovered. However, it is possible that the washing liquid separated from the washed biomass is discharged during the compression of the biomass and the separated washing liquid is not reused for washing the biomass in the washing unit.

According to another embodiment of the invention, the water separated in the separation unit is recirculated back to the first reactor unit wherein the recirculated water is reused for impregnating the biomass in the first reactor unit.

The recirculated water may thus be added to the amount of water fed into the first reactor unit such that water may be saved in the whole process. The recirculated water from the separation unit may also be recirculated back to the washing unit such that the recirculated water from the separation unit is added to the washing liquid in the washing unit and the recirculated water is also used for washing the biomass before the washed biomass is introduced into the first reactor unit. This aspect will however be described in more detail in the description of the figures.

According to an aspect of the invention, a use of a method as described above for treating non-wood material is provided.

In particular, the inventive method as described above is used for treating non-wood material instead of wood material. This means that only bulky material like straw, grass, etc. is used as biomass to be treated using the inventive method. The inventive method provides a more efficient impregnation of the biomass, e.g. the non-wood material, compared to a method using only a steaming of the biomass.

According to another aspect of the invention, a device for treating biomass is provided. The device comprises a first reactor unit, a separation unit downstream of the first reactor unit and a second reactor unit. The biomass and an amount of water are fed into the first reactor unit such that the biomass is impregnated using the amount of water while the biomass is transferred through the first reactor unit by a conveyor means. The conveyor means may for instance be a screw conveyor. The impregnated biomass is transferred from the first reactor unit to the separation unit in which at least a part of the amount of water used for impregnation can be separated from the impregnated biomass. The impregnated biomass is transferred from the separation unit into the second reactor unit in which the impregnated biomass is subjected to a predetermined and/or controllable pressure.

The first reactor unit may be vertically arranged with respect to the earth's surface such that the biomass to be impregnated within the first reactor unit is transferred or conveyed in an upward direction through the first reactor unit during the impregnation. A screw conveyor may be used to transfer the biomass in the first reactor unit during the impregnation. The separation unit may be equipped with a screw press such that at least a part of the amount of water is separated from the impregnated biomass in the separation unit, e.g. the impregnated biomass is dewatered. The predetermined pressure in the second reactor unit may be achieved, in particular controlled, by compressing the impregnated biomass by means of a force feed screw or a rotary valve arranged between the separation unit and the second reactor unit.

According to an embodiment of the invention, the conveyor means comprises at least one conveyor screw for transferring the biomass through the first reactor unit during impregnation.

However, it is possible that the plurality of conveyor screws is arranged within the first reactor unit in order to transfer the biomass through the first reactor unit during impregnation. The at least one conveyor screw may be vertically arranged within the first reactor unit. The first reactor unit may be a longitudinal vessel which is also vertically arranged with respect to the earth's surface. The first reactor unit may further be filled with the amount of water up to a predetermined fill level. In this manner it is possible that the whole biomass to be treated can be homogeneously impregnated by the amount of water when the biomass is transferred through the first reactor unit by means of the conveyor screw.

According to another embodiment of the invention, the first reactor unit is a vertically arranged, longitudinal vessel in which the biomass is conveyed in an upward direction when the biomass is impregnated using the amount of water.

The biomass to be impregnated is fed into the first reactor unit at a bottom part of the first reactor unit and, after impregnation, the impregnated biomass is discharged from the first reactor unit at a top part of the first reactor unit. In particular, the biomass is introduced at the bottom part of the first reactor unit, transferred in the upward direction by means of a conveyor screw within the first reactor unit and then discharged at the top part of the first reactor unit. The impregnation, however, takes place during the transfer of the biomass in the upward direction. If the first reactor unit is filled up to a predetermined fill level with impregnation liquid, e.g. the amount of water, the biomass can be homogeneously impregnated by the amount of water as the biomass is conveyed through the amount of water when the biomass is moved in the upward direction.

DETAILED DESCRIPTION OF THE DRAWINGS

Figure 1:
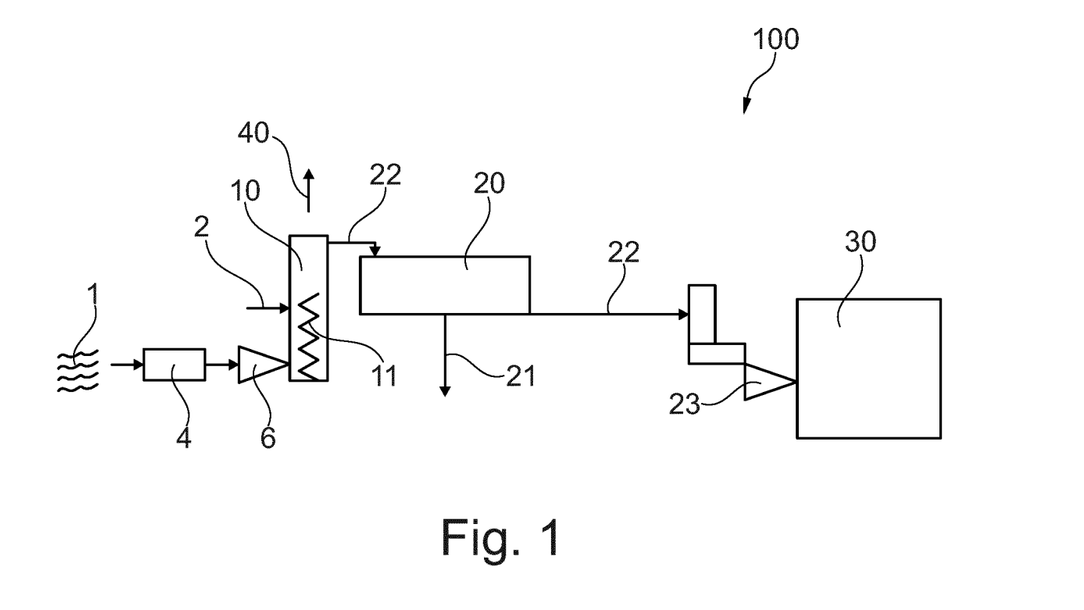
FIG. 1 schematically shows a device for treating biomass according to an embodiment of the invention.

FIG. 1 schematically shows a device 100 for treating biomass 1, in particular for treating non-wood material. The biomass 1 is fed into a washing unit 4 in which the material, e.g. the biomass, is washed before it is further treated with impregnation liquid in a first reactor unit 10. Furthermore, a cutting of the biomass 1 may be carried out before the biomass is fed into the first reactor unit 10. The biomass 1 may be fed into the first reactor unit 10 by means of a plug screw feeder 6 which is arranged in a compression unit upstream the first reactor unit 10. The plug screw feeder 6 or simply plug screw 6 may be a screw press 6. The plug screw feeder 6 may be arranged between the washing unit 4 and the first reactor unit 10. After the biomass 1 has been fed into the first reactor unit 10, the biomass is impregnated with an amount of water 2 which is also introduced into the first reactor unit 10, for example up to a predetermined fill level not shown in FIG. 1. The biomass 1 is thus impregnated using the amount of water 2 while the biomass 1 is transferred through the first reactor unit 10 by a conveyor means 11. The conveyor means may for instance be a screw conveyor which is arranged within the first reactor unit 10 in order to convey or transfer the biomass 1 to be impregnated in the first reactor unit 10 in an upward direction 40. The vertical direction 40 may be perpendicular to an earth's surface not shown in FIG. 1. In this manner it is possible that the whole biomass 1 fed into the first reactor unit 10 can be homogeneously impregnated within the first reactor unit 10 using the amount of water 2 also fed into the first reactor unit 10. After the biomass 1 has been impregnated within the first reactor unit 10, the impregnated biomass is discharged at a top part of the first reactor unit 10 and transferred to a separation unit 20 in which at least the part 21 of the amount of water 2 is separated from the impregnated biomass 22. The impregnated biomass 22 is then transferred from the separation unit 20 to a second reactor unit 30, wherein the impregnated biomass 22 is subjected to a predetermined pressure within the second reactor unit 30. This pressure may be controllable. The impregnated biomass 22 is fed into the second reactor unit 30 by means of a plug screw feeder, for example a force feed screw. In particular, the predetermined pressure within the second reactor unit 30 may be provided by arranging a plug screw 23 or a rotary valve between the separation unit 20 and the second reactor unit 30. For example, a force feed screw and a plug screw 23 may be used in combination such that both types of screws are subsequently arranged between the separation unit 20 and the second reactor unit 30. In this manner, the compaction of the impregnated biomass 22 can be enhanced.

In particular, the possibilities for arranging these components are the following: In a first example, only a plug screw 23 is arranged between the separation unit 20 and the second reactor unit 30. In a second example, a force feed screw which is followed by a plug screw 23 is arranged between the separation unit 20 and the second reactor unit 30, wherein the plug screw 23 may be fed by the force feed screw. In a third example, only a rotary valve is arranged between the separation unit 20 and the second reactor unit 30. The embodiment shown in FIG. 1 may be the simplest embodiment of the inventive device 100.

Figure 2:
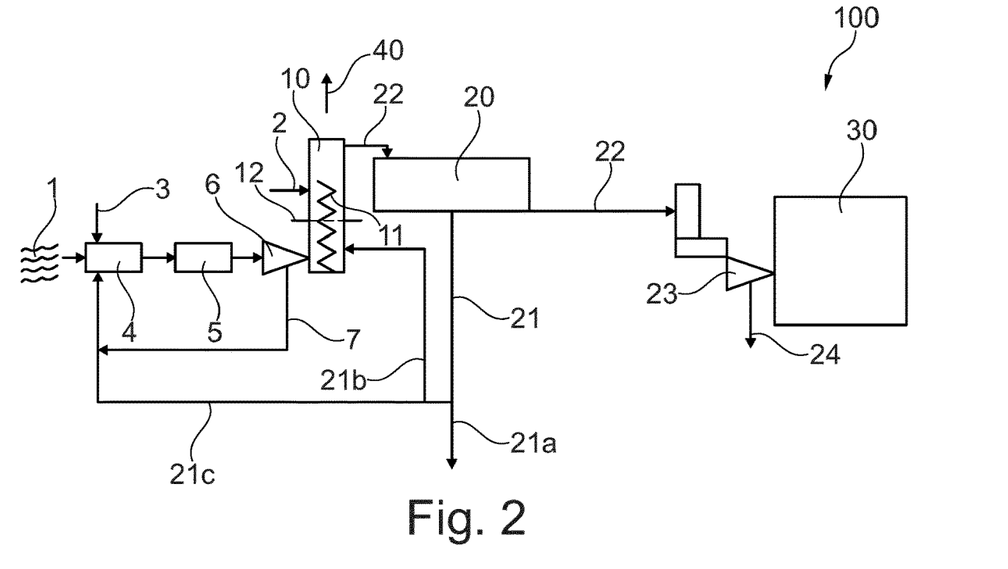
FIG. 2 schematically shows a device for treating biomass according to another embodiment of the invention.

FIG. 2 shows another embodiment of the device 100 for treating biomass 1. Therein, the biomass 1 is fed into the washing unit 4 in which the biomass 1 is washed before it is further treated in the first reactor unit 10. Therefore, a washing liquid 3, e.g. a washing agent, is introduced into the washing unit 4 such that a removal of impurities like for example sand, stone, metal, etc. from the biomass 1 can be achieved. Afterwards, or downstream the washing unit 4, a pre-steaming of the washed biomass 1 is carried out in a pre-steaming unit 5. The pre-steaming unit 5 may comprise a pre-steaming mixer. During the pre-steaming, the biomass 1 may be retained within the pre-steaming unit 5 for a short retention time. A preferred retention time for the pre-steaming of the biomass in the pre-steaming unit 5 may be between 1 second and 300 seconds.

In this manner, a better penetration of the impregnation liquid from the first reactor unit 10 in the biomass 1 can be achieved when the biomass 1 is impregnated within the first reactor unit 10. Controlling a temperature difference between the pre-steaming of the biomass 1 and the impregnation of the biomass 1 in the first reactor unit 10 is also possible in order to further improve the penetration of the impregnation liquid in the biomass 1 within the first reactor unit 10. The plug screw 6 which, for example, is arranged in a compression unit, transfers the washed and pre-steamed biomass 1 into the first reactor unit 10 in which the biomass 1 is conveyed in the upward direction described by arrow 40. In particular, the biomass 1 and an amount of water 2 is fed into the first reactor unit 10 such that the biomass 1 gets impregnated by the amount of water 2 when the biomass 1 is transferred through the first reactor unit 10 by a conveyor means 11, e.g. a screw conveyor. For the impregnation, the amount of water 2 is filled into the first reactor unit 10 up to a predetermined fill level 12 which is arranged above the bottom part of the first reactor unit 10 where the biomass 1 is fed into the first reactor unit 10. This means that the biomass 1 is introduced into the first reactor unit 10 at the bottom part of the first reactor unit 10, wherein after the impregnation of the biomass 1 within the first reactor unit 10, the impregnated biomass 22 is discharged at the top part of the first reactor unit 10. In this manner, it is possible that the whole biomass 1 introduced into the first reactor unit 10 is impregnated by the amount of water 2 present in the first reactor unit 10.

The discharged impregnated biomass 22 is then introduced into a separation unit 20 in which at least a part 21 of the amount of water 2 used for impregnation is separated from the impregnated biomass 22. A part 21c of the water separated in the separation unit 20 is recirculated back to the washing unit 4 where the part 21c of the water is reused for washing the biomass 1. Another part 21b of the water separated in the separation unit 20 is recirculated back to the first reactor unit 10 where the part 21b of the water is reused as impregnation liquid for impregnating the biomass 1 within the first reactor unit 10. It is possible that another part 21a is discharged from the device 100 without reusing the discharged part 21a of water in the device 100.

The impregnated biomass 22 is transferred from the separation unit 20 to the second reactor unit 30. A predetermined pressure within the second reactor unit 30 is controlled using a plug screw 23 or a rotary valve arranged between the separation unit 20 and the second reactor unit 30. Therefore, the plug screw 23 or the rotary valve may also be described as a pressure controlling unit. Within the plug screw 23, a further part 24 of impregnation liquid, e.g. water, may be separated from the impregnated biomass 22 before the impregnated biomass 22 is fed into the second reactor unit 30. The second reactor unit 30 may also be referred to as a high pressure reactor since a high pressure can be achieved within the second reactor unit 30. Pressures between 4 bar and 25 bar can be achieved. For example, pressure ranges may be between 10 bar and 14 bar, between 4 bar and 10 bar or between 14 bar and 25 bar.

In the second reactor unit 30, a further reaction of the impregnated biomass 22 may be carried out, wherein a reaction between the biomass and the impregnation liquid, e.g. the water, or a further catalyst introduced into the system takes place within the second reactor unit 30.

At least a part 7 of washing liquid present in the washed biomass 1 can be separated from the washed biomass 1 in the compression unit, wherein the part 7 of the separated washing liquid is recirculated back to the washing unit 4 such that this part 7 of the washing liquid can be reused in the washing unit 4 for washing the biomass 1.

Figure 3:
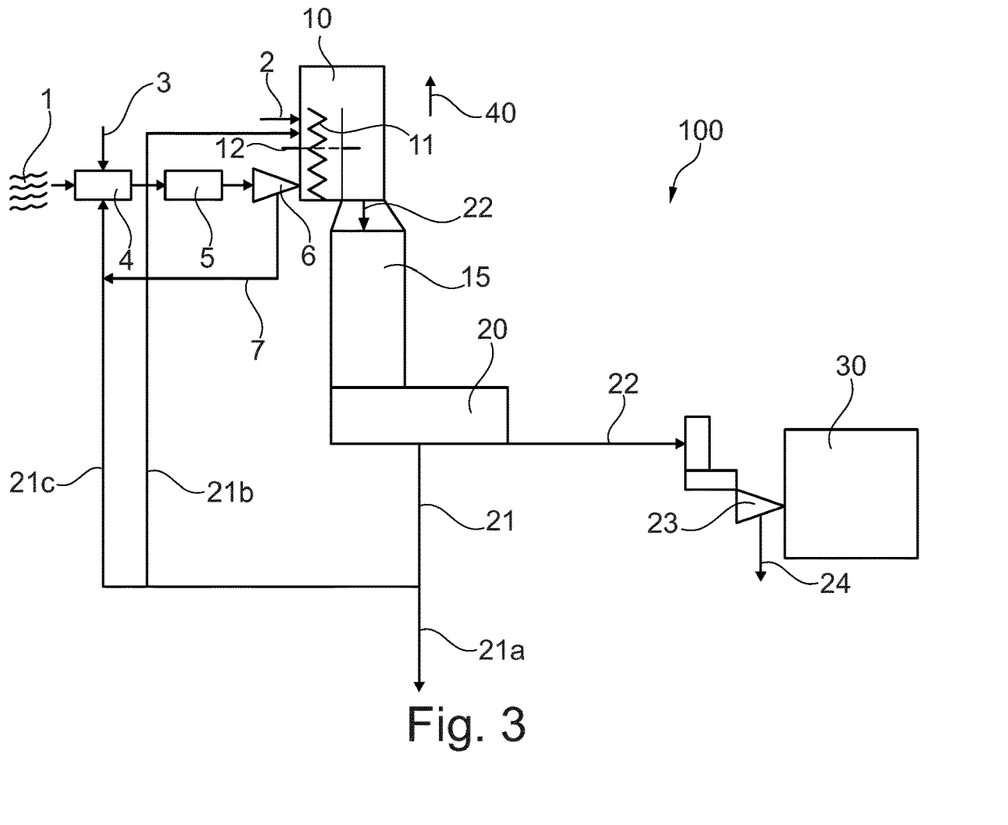
FIG. 3 schematically shows a device for treating biomass according to another embodiment of the invention.

FIG. 3 shows another embodiment of the inventive device 100. The device 100 as shown in FIG. 3 comprises the same components as shown in FIG. 2 and further comprises a retention vessel 15 being arranged between the separation unit 20 and the first reactor unit 10. Within the retention vessel 15, the homogenization of the impregnated biomass 22 coming from the first reactor unit 10 may be provided. Such a retention vessel 15 provides a more homogeneous and therefore a more efficient impregnation of the biomass before at least a part 21 of the impregnation liquid, e.g. the amount of water, is separated within the separation unit 20.

The biomass 1 is introduced into the washing unit 4 before it is transferred to the pre-steaming unit 5. Again, a recirculated part 21c from the separation unit 20 may be used for washing the biomass 1 in the washing unit 4. However, a further amount of washing liquid 3, e.g. washing agent, is introduced into the washing unit 4. After pre-steaming the washed biomass 1 in the pre-steaming unit 5, the pre-steamed and washed biomass is compressed in a compression unit, for example by a plug screw 6, such that the pre-steamed and washed biomass 1 can be efficiently introduced into the first reactor unit 10. At least a part 7 of washing liquid present in the washed biomass 1 can be separated from the washed biomass 1 in the compression unit, wherein the part 7 of the washing liquid is recirculated back to the washing unit 4 such that this part 7 of the washing liquid can be reused in the washing unit 4 for washing the biomass 1.

The pre-steamed and washed biomass 1 is fed into the first reactor unit 10. Furthermore, an amount of water 2 is also fed into the first reactor unit 10 up to a predetermined fill level 12. The biomass 1 to be impregnated is conveyed in an upward direction 40 within the first reactor unit 10, for example by a conveyor means 11. Afterwards, the impregnated biomass 22 is fed into the retention vessel 15 in which a further impregnation of the biomass 1 using the amount of water 2 is carried out. Afterwards, the impregnated biomass 22 is transferred from the retention vessel 15 to the separation unit 20 in which at least a part 21 of the amount of water 2 is separated from the impregnated biomass 22. The part 21c of the water is then recirculated back to the washing unit 4 as described above. Another part 21b is recirculated back to the first reactor unit 10 such that this part 21b of water is reused as impregnation liquid in the first reactor unit 10. Another part 21a may be discharged from the whole system, e.g. the device 100.

The impregnated biomass 22 is then discharged from the separation unit 20 into the second reactor unit 30. A predetermined pressure within the second reactor unit 30 may be adjusted by an addition of steam to the impregnated biomass 22 in the second reactor unit 30. Therein, a plug screw 23 or a rotary valve arranged between the separation unit 20 and the second reactor unit 30 may establish a pressure seal between the reactor unit 30 and upstream components. An amount of residual impregnation liquid 24 may be separated in the plug screw 23 arranged between the separation unit 20 and the second reactor unit 30.

It is possible that besides the amount of water 2 fed into the first reactor unit 10, a catalyst, e.g. an acid, may also be introduced into the system, e.g. into the device 100, downstream the first reactor unit 10. However, it is also possible that a catalyst may be additionally introduced into the first reactor unit 10.

Figure 4:
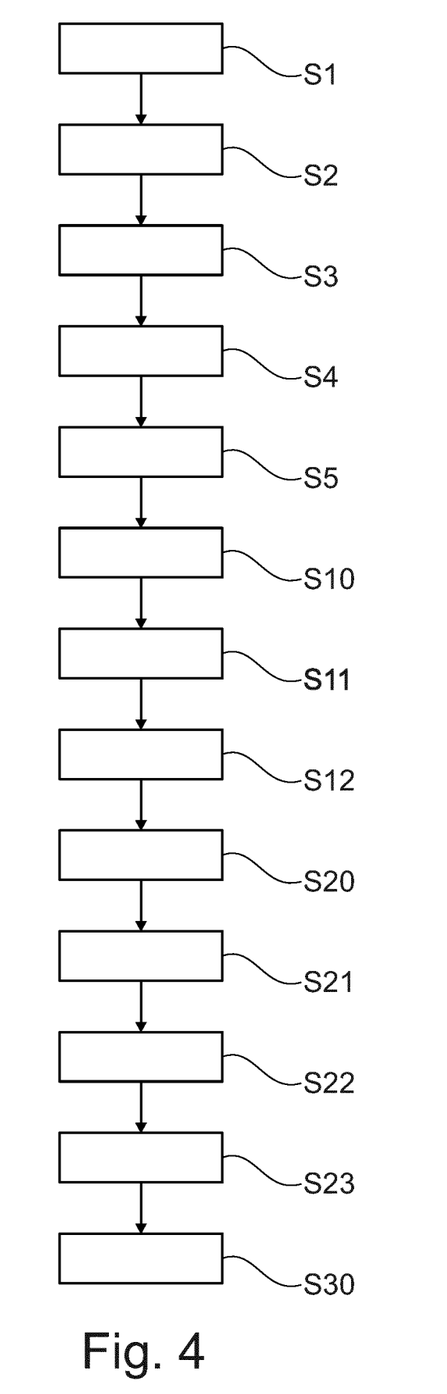
FIG. 4 shows a flow diagram of a method for treating biomass according to an embodiment of the invention.

FIG. 4 shows a flow diagram of a method for treating biomass 1. In a step S1 of the method, the biomass 1 is washed in a washing unit 4 using a washing liquid 3 before feeding the biomass 1 into the first reactor unit 10. In another step S2, the biomass 1 is pre-steamed before the biomass 1 is fed into the first reactor unit 10 wherein a pressure and/or a temperature during the pre-steaming can be controlled. This pre-steaming of the biomass 1 may be carried out in a pre-steaming unit 5. In a further step S3, a temperature difference between the pre-steaming of the biomass 1 in the pre-steaming unit 5 and the impregnation of the biomass 1 in the first reactor unit 10 is controlled. In particular, a temperature difference between the temperature in the pre-steaming unit 5 and the temperature in the first reactor unit 10 may be controlled. In an another step S4, the biomass 1 is compressed in a compression unit using a plug screw 6 before feeding the compressed biomass 1 into the first reactor unit 10 for impregnation such that residual washing liquid 7 is separated from the biomass 1 and recirculated back to the washing unit 4. The residual washing liquid 7 is reused for washing the biomass 1 in the washing unit 4. In a further step S5 of the method, an amount of water 2 is fed into the first reactor unit 10 up to a predetermined fill level 12 of the first reactor unit 10. In another step S10, the biomass 1 and the amount of water 2 is fed into the first reactor unit 10 such that the biomass 1 is impregnated using the amount of water 2 while the biomass 1 is transferred through the first reactor unit 10 by a conveyor means 11. In a further step S11, the impregnated biomass 22 is transferred from the first reactor unit 10 into a retention vessel 15 before transferring the impregnated biomass 22 to a separation unit 20. In a further step S12, the impregnated biomass 22 is steamed in the retention vessel 15 by controlling a pressure within the retention vessel 15. Furthermore, it is possible that a pressurization and/or a steam treatment takes place in both the first reactor unit 10 and in the retention vessel 15. The pressure in the retention vessel 15 may be between 1 bar and 25 bar. For example, this pressure is between 1 bar and 2 bar or between 2 bar and 8 bar. It is possible that the pressure in the first reactor unit 10 is the same as in the retention vessel 15.

In a further step S20, the impregnated biomass 22 is transferred from the first reactor unit 10 or from the retention vessel 15 to the separation unit 20 in which at least a part 21 of the amount of water 2 used for impregnation can be separated from the impregnated biomass 22. In a further step S21, a part 21 of water separated in the separation unit 20 is recirculated back to the washing unit 4 wherein the recirculated part 21 of water is used for washing the biomass 1 in the washing unit 4. In a further step S22, the part 21 of water separated in the separation unit 20 is recirculated back to the first reactor unit 10 wherein the recirculated part 21 of water is reused for impregnating the biomass 1 in the first reactor unit 10. In another step S23 of the method, a pressure is controlled within the second reactor unit 30 using a plug screw 23 or a rotary valve wherein the plug screw 23 or the rotary valve is arranged between the separation unit 20 and the second reactor unit 30. In another step S30, the impregnated biomass 22 is transferred from the separation unit 20 into the second reactor unit 30 in which the impregnated biomass 22 is subjected to the predetermined and/or controllable pressure.

While the invention has been illustrated and described in detail in the drawings and the foregoing description, such illustration and description are to be considered illustrative and exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims the term "comprising" does not exclude other elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of protection.

The invention claimed is:

1. A method for treating biomass, the method comprising:
   feeding the biomass (1) and an amount of water (2) as an impregnation liquid into a first reactor unit (10) such that the biomass (1) is impregnated using the amount of water (2) as the impregnation liquid while the biomass (1) is transferred through the first reactor unit (10) by a conveyor means (11, S10);

transferring the impregnated biomass (22) from the first reactor unit (10) to a separation unit (20) in which at least a part (21) of the amount of water (2) used for impregnation can be separated from the impregnated biomass (22, S20);

transferring the impregnated biomass (22) from the separation unit (20) into a second reactor unit (30) in which the impregnated biomass (22) is subjected to a predetermined pressure (S30) and hydrolysis of the impregnated biomass takes place in the second reactor unit;

wherein the impregnation of the biomass (1) in the first reactor unit (10) is carried out exclusively using the amount of water (2) fed into the first reactor unit (10).

2. The method of claim 1 further comprising:
feeding the amount of water (2) into the first reactor unit (10) up to a predetermined fill level (12) of the first reactor unit (10, S5).

3. The method of claim 1 further comprising:
transferring the impregnated biomass (22) from the first reactor unit (10) into a retention vessel (15) before transferring the impregnated biomass (22) to the separation unit (20, S11); and
steaming the impregnated biomass (22) in the retention vessel (15) by controlling a pressure within the retention vessel (15, S12), whereby the retention vessel is operated at atmospheric conditions.

4. The method of claim 3, wherein the pressure in the retention vessel (15) is equal to a pressure in the first reactor unit (10).

5. The method of claim 1 further comprising:
pre-steaming the biomass (1) before feeding the biomass (1) into the first reactor unit (10), wherein a pressure and/or a temperature during the pre-steaming can be controlled (S2).

6. The method of claim 5:
controlling a temperature difference between a temperature during the pre-steaming of the biomass (1) and a temperature during the impregnation of the biomass (1) in the first reactor unit (10, S3).

7. The method of claim 1 further comprising:
washing the biomass (1) in a washing unit (4) by means of a washing liquid (3) before feeding the biomass (1) into the first reactor unit (10, S1).

8. The method of claim 7, comprising:
recirculating a part (21) of water separated in the separation unit (20) back to the washing unit (4) and using the recirculated part (21) of water for washing the biomass (1) in the washing unit (4, S21).

9. The method of claim 7 comprising:
compressing the biomass (1) using a plug screw feeder (6) before feeding the compressed biomass (1) into the first reactor unit (10) for impregnation such that residual washing liquid (7) is separated from the biomass (1) and is recirculated back to the washing unit (4), wherein the residual washing liquid (7) is reused for washing the biomass (1) in the washing unit (4, S4).

10. The method of claim 1 further comprising:
recirculating the part (21) of water separated in the separation unit (20) back to the first reactor unit (10) and reusing the recirculated part (21) of water for impregnating the biomass (1) in the first reactor unit (10, S22).

11. The method of claim 1 for treating non-wood material.

12. The method of claim 1 further comprising controlling the predetermined pressure within the second reactor unit (30) using a plug screw (23) or a rotary valve, wherein the plug screw (23) or the rotary valve is arranged between the separation unit (20) and the second reactor unit (30, S23).

13. The method of claim 1 further comprising:
transferring the impregnated biomass (22) from the first reactor unit (10) into a retention vessel (15) before transferring the impregnated biomass (22) to the separation unit (20, S11); and
steaming the impregnated biomass (22) in the retention vessel (15) by controlling a pressure within the retention vessel (15, S12), whereby the retention vessel is operated at pressurized conditions.

14. The method of claim 13, wherein the pressure in the retention vessel (15) is equal to a pressure in the first reactor unit (10).

15. The method of claim 1, wherein an acid or a catalyst is fed into the system downstream the first reactor unit.

* * * * *